SOFA BED

Original Filed Sept. 1, 1964 4 Sheets-Sheet 1

INVENTOR.
WALTER CLARK ROGERS, JR

BY
Brown, Schuyler, & Beveridge
ATTORNEYS.

SOFA BED

Original Filed Sept. 1, 1964 4 Sheets-Sheet 2

INVENTOR
WALTER CLARK ROGERS, JR
BY
Brown, Schuyler, & Berenson
ATTORNEYS

SOFA BED

Original Filed Sept. 1, 1964 4 Sheets-Sheet 3

INVENTOR.
WALTER CLARK ROGERS, JR.
BY
Brown, Schuyler & Beveridge
ATTORNEYS

SOFA BED

Original Filed Sept. 1, 1964 4 Sheets-Sheet 4

INVENTOR.
WALTER CLARK ROGERS, JR
BY
Brown, Schuyler, & Bennigson
ATTORNEYS.

United States Patent Office

Re. 26,671
Reissued Sept. 30, 1969

26,671
SOFA BED

Walter Clark Rogers, Jr., High Point, N.C., assignor to General Steel Products, Inc., High Point, N.C., a corporation of North Carolina Original No. 3,298,041, dated Jan. 17, 1967, Ser. No. 393,571, Sept. 1, 1964. Application for reissue Sept. 26, 1967, Ser. No. 682,693
Int. Cl. A47c 17/13
U.S. Cl. 5—13 17 Claims

Matter enclosed in heavy brackets [ ] appears in the original patent but forms no part of this reissue specification; matter printed in italics indicates the additions made by reissue.

*ABSTRACT OF THE DISCLOSURE*

*A sofa bed including pivotally connected auxiliary, rear, intermediate and forward bed sections, with the bed sections being movable between a retracted position and an extended position. In the retracted position, the auxiliary section is disposed generally upright rearwardly of a cross rail of a sofa back; and the rear, intermediate and forward sections are disposed generally below the plane of the upper surface of a unitary front rail, with the forward section being disposed generally parallel with the rear section, and with the intermediate section extending generally vertically between the rear and forward sections inwardly of the front rail. In the extended position, the auxiliary, rear, intermediate and forward sections are disposed in generally coplanar relationship above the plane of the upper surface of the front rail; with the rear, intermediate and forward sections extending forwardly of the front rail.*

This invention relates to sofa beds of the type in which a foldable bed frame is mounted in a sofa in such a manner that it can be retracted within the sofa when not in use where it is hidden from view by the front panel of the sofa and the sofa cushions. For use as a bed, the cushions are removed and the bed frame is projected from the sofa portion and unfolded to the bed position.

In conventional sofa beds, the front panel of the sofa, or a portion thereof, is connected with the bed mechanism so that when the bed is projected from the sofa, the front panel is carried from its normal position by the bed or, in some cases, the front panel is completely removed from the sofa before the bed portion is projected from the sofa. This has been necessary in order that the folded, retracted bed does not protrude above the front board or panel of the sofa in order that the sofa cushions are supported at a comfortable seating height. As a result, the periodic removal and replacement of the front panel, which is usually upholstered, creates wear.

In my copending application, Serial No. 284,412 filed May 31, 1963, the entire disclosure of which is incorporated herein by reference, a sofa bed is disclosed in which a bed frame consisting of three sections is connected with the sofa frame in such a manner that the bed frame moves up and over the front board without disturbing the sofa framework as it moves between its retracted and projected positions. When not in use, the folded frame is stored within the space defined by the front board and side frame members of the sofa frame so that when the bed frame is retracted within the sofa portion, it serves as a support for the cushions of the sofa.

One of the objects of this invention is to provide improved mechanism for moving a bed frame between its retracted and extended position relative to the sofa with a minimum of effort, and without the necessity of displacing portions of the sofa framework.

A further object is to provide a sofa bed having a bed frame with four pivotally connected sections that can be projected from and retracted into the sofa portion without displacement of the front board or other portions of the sofa framework.

In achievement of the foregoing, and additional objects, the side frame members and front board of the sofa frame cooperate to define a bed frame storage space. Curved support arms or levers are pivotally attached to the side frame members at a point adjacent their forward ends, and rear support or control levers are pivotally attached to the side frame members at a point located to the rear and above the pivot points of the forward support arm. The distance between the free end and pivot point of the forward support arm is substantially greater than the distance between the free end and pivot point of the control lever, and the free ends of the support arm and control lever are interconnected with the bed frame through an expansible compound link and lever system. When the bed frame is retracted within the sofa portion, the compound link and lever system is contracted and as the bed frame is projected from the sofa portion, the compound link and lever system is extended by the resulting separation of the ends of the support arm and control lever. During movement of the bed frame from its retracted to extended position, the support arm carries the bed up and over the front board and the control lever and link and lever system cause the bed frame to move about the free end of the support arm and assume a horizontal, extended position where it can be unfolded to define a bed, the curvature of the support arm accommodating the front board.

Other objects and advantages of the invention will become apparent from the following description taken in connection with the accompanying drawings in which.

Figure 1:
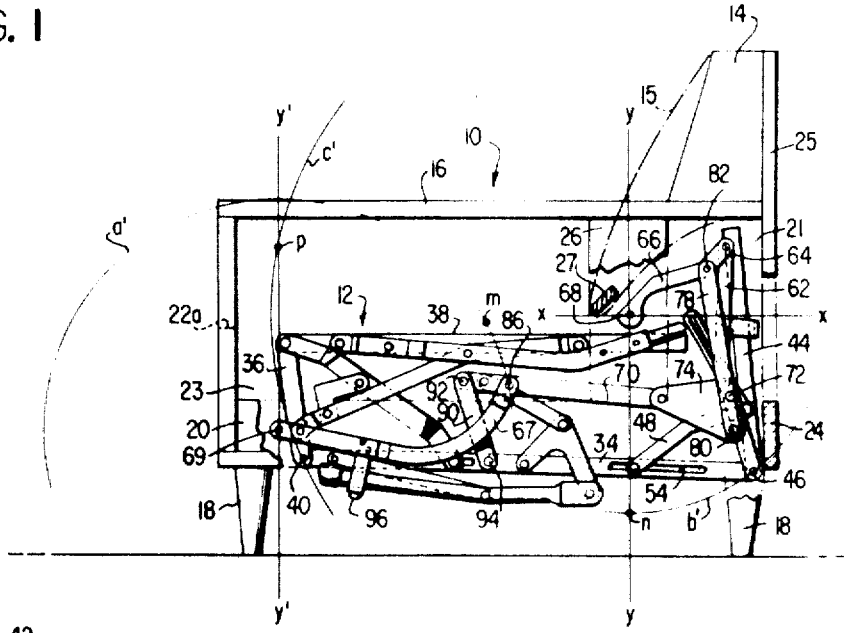
FIGS. 1, 2, 3 and 4 are end views of the sofa with certain parts broken away, illustrating the bed frame in successive positions as it moves from its retracted position in FIG. 1 to its fully extended and unfolded position of FIG. 4.

With reference to FIGS. 1 through 5 and 7, the sofa frame portion and bed frame are designated generally by reference numerals 10 and 12, respectively. Sofa portion 10 includes a back member 14, arm members 16 and legs 18. Arm members 16 include vertical and horizontal side frame members 26 and 20, respectively, and back 14 includes a front portion 15 and a rear portion defined by a back frame member 25. Defined between back frame 25 and the front upholstered portion 15 of the sofa back is a storage cavity 21.

Extending between the rear end of side frame members 20 is a lower, horizontal back frame member 24, and extending between the forward ends of side frame members 20 is a front panel or board 22. Front board 22 cooperates with the side frame members to define a storage space 23 (FIG. 7) the upper limit of which is defined by the horizontal plane tangent to the upper edge **22*a* of front-board 22. The front upholstered portion 15 of back 14 is supported at its lower edge by a horizontal frame member 27 extending between the vertical side frame members 26**.

For supporting the bed frame and operating linkage on the sofa frame, a plate member 28 (FIG. 7) is secured to the horizontal side frame member 20 to which is secured one end of a support bracket 30 which extends vertically above side frame member 20 and is secured by a conventional screw to the vertical side frame member 26. Bracket 30 is braced laterally by a bar 32 having its ends secured to bracket 30 and plate 28.

Figure 3:
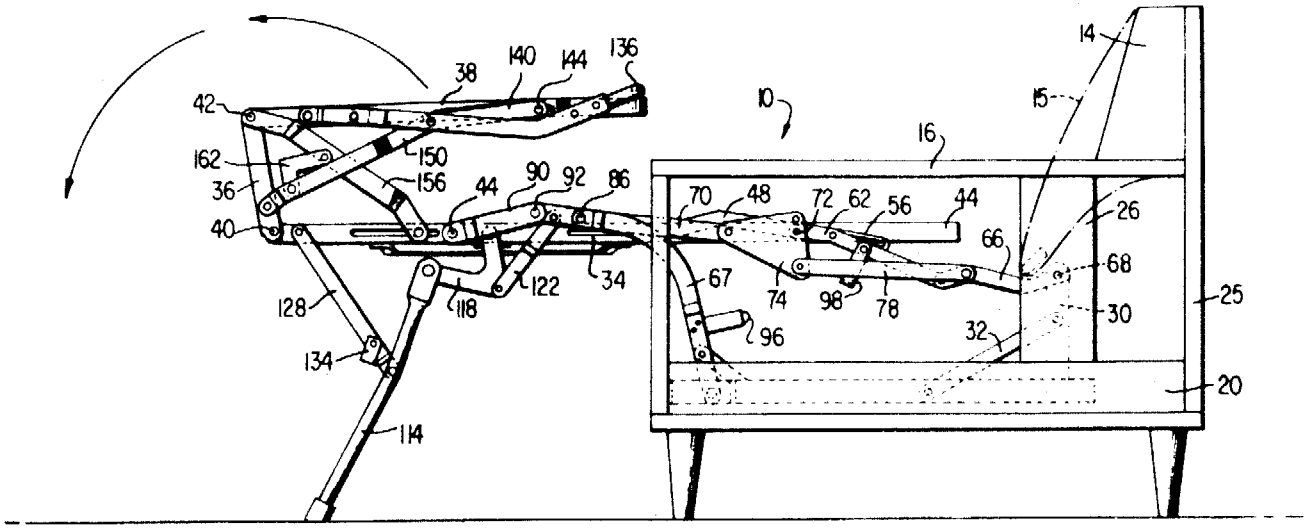
Figure 4:
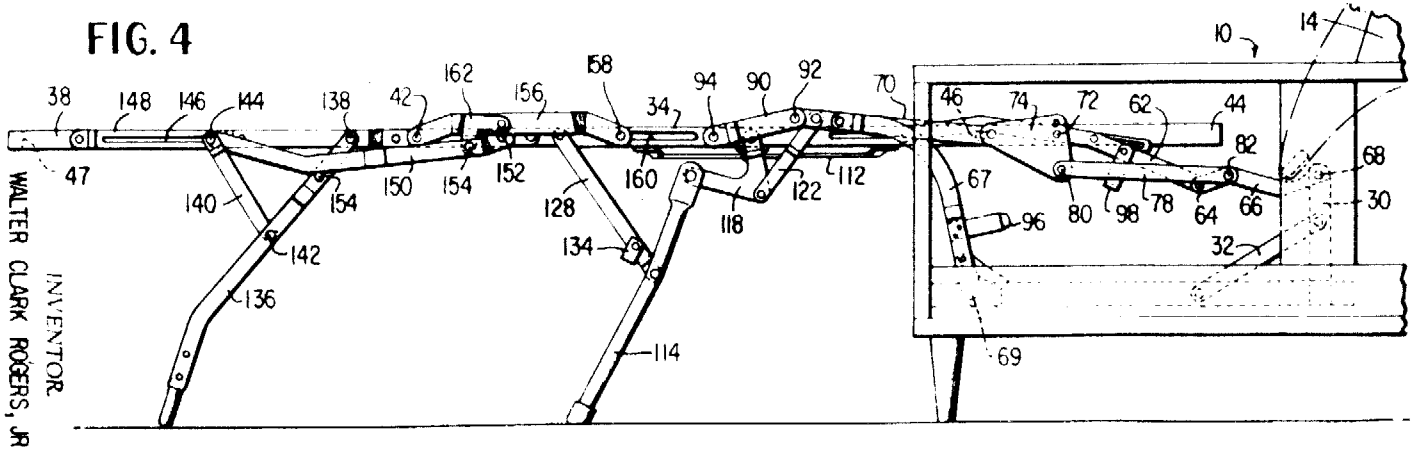
Figure 5:
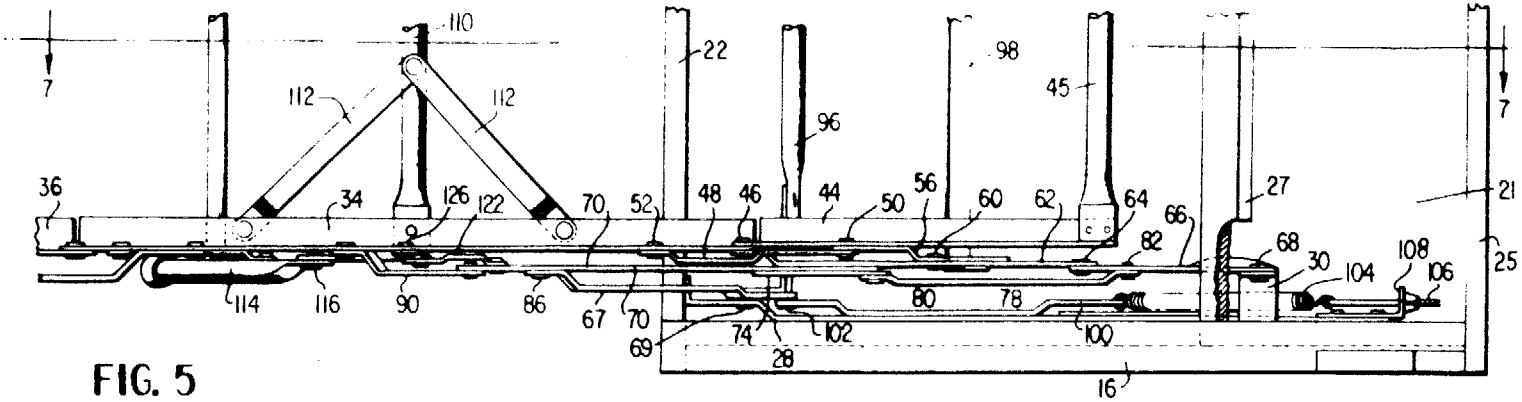
FIG. 5 is a top view of the sofa bed with the bed frame in its projected and unfolded position.
Figure 7:
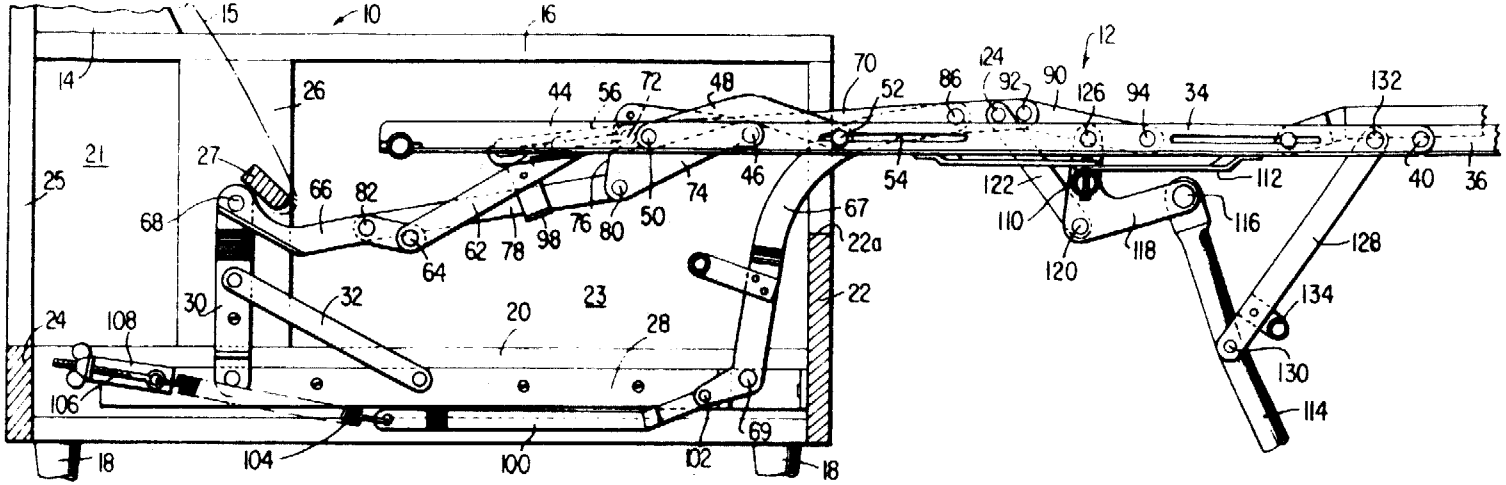
FIG. 7 is a view taken on line 7—7 of FIG. 5.

Bed frame 12 includes a main frame portion having rear, intermediate and forward sections, 34, 36 and 38, respectively. Rear section 34 is pivotally connected by a pin or rivet 40 to the end of intermediate section 36, and the other end of intermediate section 36 is pivotally connected by a pin or rivet 42 with forward section 38. Pivotally connected by rivets 46 with the rear end of rear frame section 34 is an auxiliary frame section, or headrest section 44. When bed frame 12 is in the extended or projected position shown in FIGS. 3 and 7, it can be unfolded as shown in FIGS. 4, 5 and 7 to define a rectangular bed in which sections 34, 36, 38 and 44 are in horizontal alignment defining the side rails of the bed. End rails 45 and 47 extend between the side rails of sections 44 and 38, respectively, at their ends, and a wire mesh fabric is secured to the inner periphery of the frame sections for supporting a mattress in the usual manner.

From the unfolded bed positions of FIGS. 4, 5 and 7, frame 12 can be folded into a collapsed position in which rear and forward sections 34 and 38 assume spaced, superposed positions relative to each other to thereby, respectively, constitute the lower and upper sections of the folded bed frame. In FIG. 3, the bed is shown in its projected position relative to sofa portion 10 with the bed frame in its folded position with intermediate section 36 extending substantially vertically between the forward and rear ends, respectively, of rear and forward sections 34 and 38. Auxiliary frame section 44 is in horizontal alignment with rear section 34, being supported in the latter position by means of a link 48 having one end pivotally connected by a rivet 50 with section 44, and its other end pivotally and slidably connected with rear frame section 34 by means of a pin 52 which is received in a slot 54 formed in rear section 34.

Figure 9:
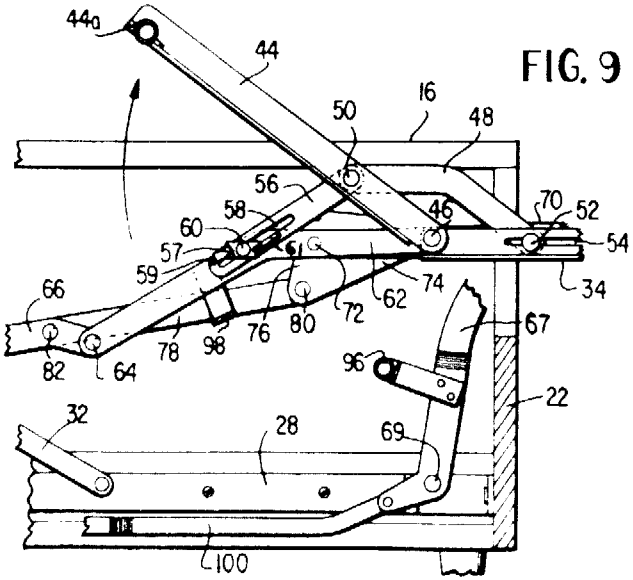
FIG. 9 is an enlarged detailed view of the auxiliary or headrest section of the bed frame.

When bed frame 12 is projected from the sofa and unfolded to define a bed as shown in FIGS. 4, 5 and 7, auxiliary frame section 44 may be pivoted from its horizontally aligned position relative to rear, intermediate and forward sections 34, 36 and 38 to an inclined position as shown in FIG. 9 to serve as a head rest for the occupant of the bed. Section 44 may be pivoted in a clockwise direction about pivot 46 to the inclined position shown in FIG. 9 where it is supported in the inclined position by means of a support link 56. Link 56 is pivotally connected by rivet 50 with auxiliary frame section 44, and is pivotally and slidably connected with a guide link or lever 62 by means of a rivet or pin 60 which is received in a slot 58 formed in support link 56. Rotatably mounted on rivet 60 is a latch member 57 having oppositely disposed notched ends which cooperate with an actuating lug 59 and a locking lug 61 formed on link 56 to support the headrest section in its inclined position.

To move headrest section 44 to its inclined position, the headrest section is pivoted in a clockwise direction about pin 46 until latch actuating lug 59 engages the lower-most notch of latching member 57 to align the opposite notch with latching lug 61. Then, as the section is pivoted downward slightly, latching lug 61 seats in the adjacent notch of latching member 57. Further counterclockwise pivotal movement is prevented since the force on latching lug 61 acts vertically along the longitudinal axis of latching member 57 preventing it from rotating. Since headrest section 44 is not directly connected with main frame sections 34, 36 and 38, its operation does not influence or interfere with the operation of the main frame sections, and the portion of the mattress and springs supported by section 44 can be selectively raised to the inclined position as shown in FIG. 9.

To return headrest section 44 from the inclined position illustrated in FIG. 9 to a horizontally aligned position relative to rear frame section 34, the auxiliary or headrest section is pivoted upwardly about its pivot 46 causing latch actuating lug 59 to engage the lower side of latching member 57 which in turn causes it to pivot until the straight sides of the latching member assumes a position substantially perpendicular to slot 58 with the notches disposed out of alignment with locking lug 61. Thereafter, downward pivotal movement of headrest section 44 causes latching member 57 to slide past locking lug 61 permitting the headrest section to return to its horizontal position.

Bed frame 12 is supported on the side frame members of the sofa portion by means of control lever 66 and a curved support arm or lever 67. Lever 66 is pivotally mounted at one end on side frame member 26 by means of a pin or rivet 68 received in the upper end of bracket 30.

Support arm or lever 67 is pivotally mounted on the side frame member by means of a pin or rivet 69 which is received in plate member 28 adjacent the forward end of side frame member 20 and the rear, inner face of front board 22.

Control lever 66 and support arm 67 are interconnected with rear frame section 34 through an expansible compound link and lever system consisting of a bent guide lever or link 62, a drive lever or link 70, and a restraining link 78. Guide lever 62 has one end pivotally connected at 64 adjacent the free end of control lever 66, and its other end pivotally connected by rivet 46 with the rear end of rear frame section 34. Drive lever 70 is pivotally mounted on guide lever 62 intermediate its ends by a rivet or pin 72 which extends through a triangular cap 74 forming one end of lever 70. Drive lever 70 is provided with a crank arm 76 defined by the rear edge of triangular cap 74 (FIG. 7). Restraining link 78 is pivoted at one end by a rivet 82 with control lever 66 at a point spaced from the pivotal connection 64 between guide lever 62 and control lever 66. Link 78 has its other end pivotally connected by a pin or rivet 80 with the lower end of crank arm 76 of lever 70. Support arm 67 has its free end pivotally connected to drive lever 70 near its free end by a pin or rivet 86. The free end of drive lever 70 is pivotally connected through a link 90 with rear frame section 34 by means of pins or rivets 92 and 94 at the ends of link 90.

Figure 8:
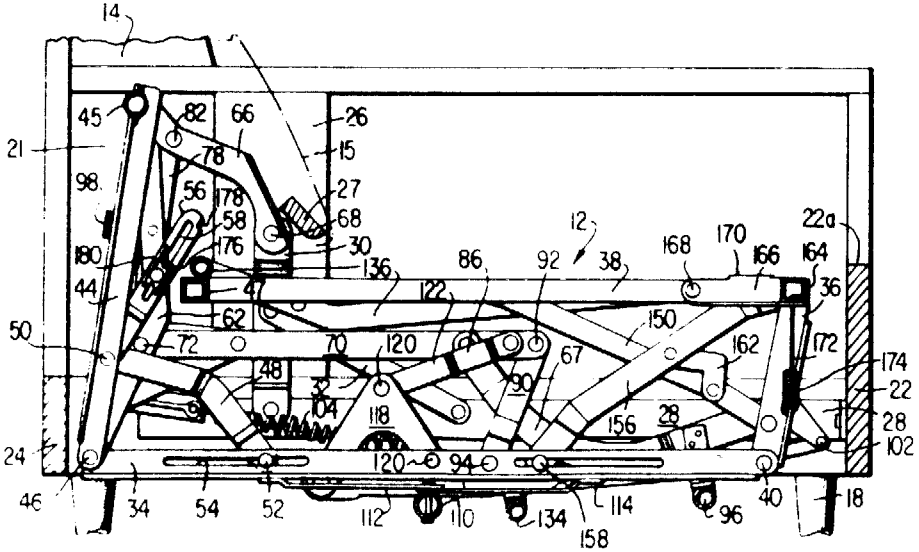
FIG. 8 is a view similar to FIG. 7 with the bed frame in its retracted, folded position.

For supporting the folded bed frame in the retracted positions, a forward support rod 96 is carried by support arm 67, which, in the retracted position as shown in FIG. 8, supports the folded bed frame through rear section 34. Auxiliary frame section 44 is carried from the horizontal position shown in FIG. 7 to a generally vertical position shown in FIG. 8 in which it projects into cavity 21 as the bed moves from the projected to the retracted position by means of a rear support bar 98 carried by guide lever 62.

Pivotally connected with an extension formed on the lower end of support arm 67 by a rivet 102 is a link 100 having its other end secured to a balance spring 104. Balance spring 104 reacts between link 100 and an eyebolt 106 mounted on a bracket 108 secured to plate 28. Rotation of support arm 67 to its retracted position of FIG. 8 extends spring 104 so that the resilient force of the spring assists in moving the bed frame both to and from its retracted position.

When the bed is unfolded to the position of FIGS. 4 and 5, the side rails of section 34 are laterally supported by a crossbar 110 which is braced by bars 112 connected between section 34 and crossbar 110. As the bed moves from its retracted to extended position, a rear leg member 114 is actuated from an operative position to a floor supporting position by means of bell crank lever 118 which is interconnected with drive lever 70 through a leg actuating link 22. Bell crank lever 118 is pivotally connected by a rivet 120 to the end of actuating link 122, the other end of actuating link 122 being pivoted to drive lever 70 at 124. Bell crank lever 118 has one end pivoted to leg 114 at 116 and its other end pivoted at 126 to rear frame section 34. Leg 114 is pivoted at 130 to one end of a link 128, the other end of which is pivoted at 132 to section 34.

A cross brace 134 may be provided between links 128 to provide additional lateral support for the legs. As the bed frame is extended from the sofa, drive lever 70 acts through leg actuating link 122 to cause leg 114 to pivot about rivet 116 until it assumes its floor supporting position shown in FIGS. 3, 4, 7 in a manner to be described in detail below.

Secured to the outer side of forward section 38 is a plate member 148 having a slot 146 formed therein. Rear frame section 34 is formed with a forward slot 160. Pivotally connected at a point 152 on intermediate section 36 is one end of a link 150, the other end of which is pivotally and slidably connected by a pin 144 with slot 146. Pivotally connected at point 42 between sections 36 and 38 is one end of a link 156, the other end of which is connected with a pin 158 slidably received in slot 160. Link 150 and link 156 are interconnected intermediate their ends by an L-shaped connecting link 162. One end of a leg member 136 is pivotally connected by a pin 138 to section 38. One end of a locking link 140 is pivotally connected with leg member 136 intermediate its ends by a pin 142 and the other end of locking link 140 is secured by a pin 144 to link 150.

To fold the fed frame from the horizontally aligned position of FIGS. 3 and 7 to the folded or collapsed position the operator may grasp rail 47 and move forward section 38 upwardly about pivot 42. Upon the initial movement, link 150 pivots about point 152 and pin 144. This initial movement is transmitted through connecting link 162 to link 156 and intermediate frame section 36 causing link 156 to pivot clockwise about pin 158, and section 36 to pivot clockwise about pin 40.

Connecting link 162 pivots clockwise as section 38 moves upwardly and causes pin 158 to move toward the rear of slot 160. At the same time, pin 144 is cammed forwardly in slot 146 carrying with it the end of locking link 140 which in turn causes leg 136 to pivot counterclockwise about pivot 138 toward its folded position in which it overlies forward section 38 with its horizontal portion against the top of section 38. As section 38 assumes its collapsed position superimposed above section 34, pin 158 is positioned at the rear of slot 160 and pin 144 is positioned at the end of slot 146. When this position is reached, leg member 136 and locking link 140 are slightly inclined in an upward direction from section 38. In this position, the parts can be unfolded by reversing the above operation. However, further downward movement of leg member 136 causes pin 142 between locking link 140 and leg 36 to move to a position below the plane of pin 144 due to the configuration of leg 136. This overcenter or locking position of locking link 140 prevents upward movement of section 38 since any upward movement of section 38 tends to cause pin 142 to move counterclockwise about pin 144 in FIG. 3. Since frame sections 34, 36 and 38 are firmly locked in the collapsed position against relative movement by locking link 140 and leg member 136, the mattress which is folded upon itself and compressed between the frame sections, is firmly held in place.

Figure 6:
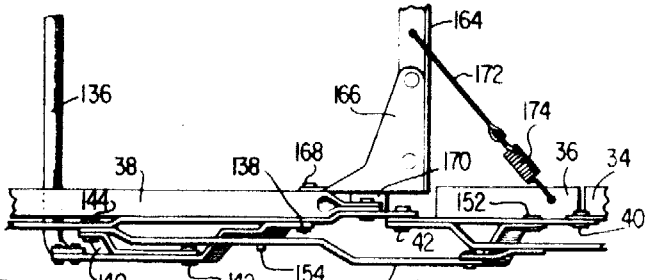
FIG. 6 is an enlarged detailed view of a portion of the bed frame.

With reference to FIG. 6, a floating crossbar 164 is pivotally connected to forward section 38 adjacent its rear end by means of a rivet 168 interconnecting section 38 with a plate member 166 at the ends of crossbar 164. Plate 166 is formed with a stop flange 170 which prevents clockwise movement of crossbar 164 about pivot point 168 as viewed in FIG. 4. Interconnected between crossbar 164 and section 36 is a spring link 172 having one end connected with a spring member 174 so that as the bed frame is folded, crossbar 164 is resiliently urged into a position against the upper end of section 36 in which flange 170 abuts section 38 to form a cushion support (FIG. 8). Conversely, when the bed is unfolded, spring 174 resiliently supports crossbar 164 permitting it to freely pivot about 168.

Referring to FIGS. 1 and 8, when the folded bed frame is in its retracted position within the sofa, rear or lower main frame section 34 is disposed substantially horizontally in storage space 23 with its forward end at pivot point 40 positioned adjacent the forward end of the storage defined by the rear or inner face of front board 22. The forward, or upper main frame section 38 is disposed in the storage space in superposed, substantially parallel relationship with rear frame section 34. No portion of the folded bed frame projects above the upper limit or boundary of storage space 23 between portion 15 of the sofa back and the front board 22. When the sofa cushions are placed on the soft, they may rest on frame section 38 and cooperate with front board 22 to completely enclose the bed frame. In the retracted position of FIGS. 1 and 8, control lever 66 projects rearwardly of its fulcrum at pivot point 68 into cavity 21, and members 78 and 62, as well as auxiliary frame section 44 project upwardly relative to rear frame section 34 into cavity 21. Rearward pivotal movement (clockwise in FIG. 1 and counterclockwise in FIG. 8) of auxiliary frame section 44 about pivot point 46 is limited by support member 98, and forward pivotal movement of auxiliary frame section 44 about pivot point 46 is limited by the horizontal, floor engaging portion of leg member 136. Support arm 67 projects rearwardly of pivot point 69 into storage space 23.

Pivot point 72 of drive lever 70 is in a dead center position relative to pivot point 80 and 82, pivots 72, 80 and 82 lying on a straight line which is substantially parallel to a straight line connecting pivot points 46 and 64, and pivot point 94 between link 90 and rear frame member 34 is disposed rearwardly of pivot point 92, or to the right as viewed in FIG. 1.

To move the folded bed frame from its retracted position within storage space 23 to its extended position illustrated in FIGS. 3, 4, and 7, the operator lifts the forward end of the bed frame upwardly by grasping crossbar 164. The resulting upward force causes support arm 67 to rotate upwardly about pivot point 69 (clockwise in FIG. 8) and control lever 66 to rotate downwardly about pivot point 68 (counterclockwise in FIG. 8). Since pivot points 68 and 69 are fixed, pivot point 86 moves in a circular path or arc about point 69 indicated at a' in FIG. 1, and pivot points 64 and 82 move in circular paths or arcs about point 68. Pivot point 86 moves upwardly and forwardly about point 69 along arc a' until it reaches a vertical position relative to point 69 on line y' in FIGS. 1 and 2. The rate of forward horizontal movement of pivot point 86 increases as it approaches the vertical axis y', and the rate of upward, vertical movement of pivot point 86 decreases as it approaches line y'. After passing line y', pivot point 86 moves downwardly and forwardly along arc a' until it reaches its extended position as shown in FIGS. 3, 4 and 7. In the extended position, the curved portion of support arm 67 accommodates the front board, and pivot point 86 projects forwardly of the front board and lies in a horizontal plane elevated above the upper limit of storage space 23.

Figure 2:
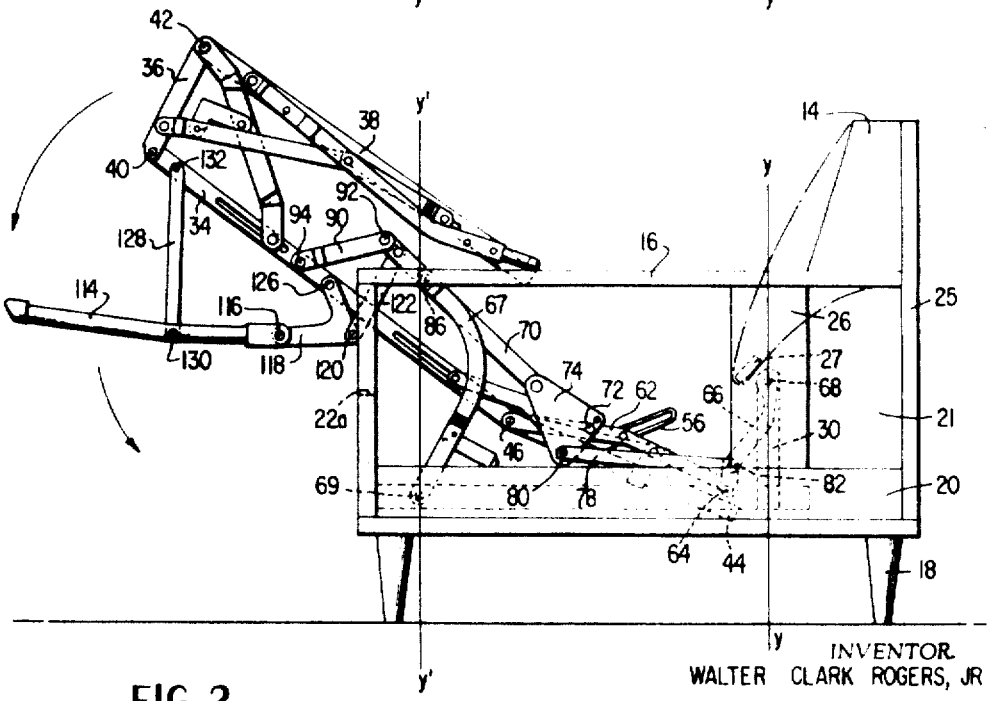

From their retracted positions of FIG. 1, pivot points 82 and 64 move downwardly and rearwardly in circular paths about pivot point 68 until they pass through the horizontal axis indicated at x in FIGS. 1 and 2, which passes through pivot point 68. After passing the horizontal axis, pivot points 82 and 64 move in a downward and forward direction with the rate of vertical, downward movement decreasing and the rate of horizontal, forward movement increasing as pivot points 82 and 64 approach the vertical axis indicated at y in FIGS. 1 and 2, which passes through pivot point 68. Lever 66 then continues to rotate clockwise about pivot point 68 to move points 64 and 82 upwardly and forwardly from line y until lever 66 reaches its extended position shown in FIGS. 3, 4 and 7 in which it projects forwardly of pivot point 68.

In the retracted position, the distance between pivot point 86 at the free end of support arm 67 and pivot points 64 and 82 on control lever 66 is substantially less than when members 66 and 67 are in their extended positions as shown in FIGS. 3 and 7. The separation of the free ends of members 66 and 67 as they rotate from their retracted to extended positions causes the compound link and lever system including members 62, 78 and 70 to expand or extend from its contracted position of FIG. 1 to its expanded or elongated condition of FIGS. 3 and 7.

During the time that pivot point 86 moves upwardly to the approximate position indicated at point m on arc a', there is substantially no relative movement between members 62, 66, 70, 78, 90 and 34, and the latter members rotate as a unit about pivot points 68, pivot point 46 moving in a circular path or arc b' about pivot point 68 until it reaches the approximate position indicated at n (FIG. 1). Similarly, pivot point 40 moves in a circular path or arc c' about pivot point 68 to the approximate position indicated at p in FIG. 1, the latter point being located above the upper edge 22a of front board 22. At this point, i.e., with pivots 86, 46 and 40 at points m, n, and p, respectively, pivots 64 and 82 pass through the horizontal line x, and link 78 begins to move off dead center with respect to pivot point 72 permitting the link and lever system to expand, and the distance between pivot point 86 and pivot points 82 and 64 begins to increase.

After pivot 86 moves upwardly beyond point m on arc a', the horizontal movement of point 86 in a forward, or leftward direction in FIG. 1, is sufficient to pull pivot point 72 off dead center with respect to pivot points 80 and 82 to thereby unlock the compound link and lever system and permit it to unfold or extend. Moreover, the distance between pivot point 46 and pivot point 68 begins to increase at a rate faster than the increase in distance between pivot point 72 and pivot point 68 since pivot point 72 is located on member 62 between pivot point 46 and pivot point 64. Consequently, rear frame member 34 is impelled forwardly relative to drive lever 70 in a plane generally parallel to the plane of drive lever 70 causing link 90 to rotate in a clockwise direction about pivot point 92 as viewed in FIGS. 1 and 2. As members 66 and 67 move toward their extended positions, the angle between members 62 and 66 increases, and the angle between members 70 and 62 increases, and counterclockwise rotation about pivot 72 is imparted to drive lever 70.

As pivot point 86 continues to move forwardly from its position shown in FIG. 2, members 62 and 66 continue to unfold or "straighten out" with respect to each other, and as pivot 92 approaches rear frame member 34, pivot point 46 begins to move upwardly relative to pivot point 94, i.e., counterclockwise rotation is imparted to rear frame section 34 as it moves over front board 22, and it assumes a horizontal attitude or position as shown in FIG. 3 when pivot point 86 reaches its extended position. Thus, support member 67 moves the bed frame up and over front board 22, and control lever 66, cooperating with member 67, causes the compound link and lever system to expand and shift the bed frame about forward support member 67 to assume its extended position. In the extended position, the portion of link 62 between pivot points 46 and 72 is in substantially coplanar, parallel relationship with auxiliary frame section 44 in its horizontally aligned position relative to section 34, and the rear portion of link 62 between pivot points 72 and 64 projects downwardly and rearwardly relative to the plane of rear section 34 and auxiliary section 44.

During the movement of the bed frame to its extended position, auxiliary frame section 44 pivots about point 46 into horizontal alignment with rear frame section 34 as the angle between section 34 and member 62 increases. As the bed frame moves from its retracted position, pin 52 of link 48 slides rearwardly in slot 54 (FIGS. 7, 8 and 9) as auxiliary frame section 44 follows support member 98 until the parts are in the approximate position shown in FIG. 2. At this point the mid-point of link 48 engages the upper edge of member 62 and the continued movement of the bed frame toward its extended position causes auxiliary section 44 to move out of engagement with support member 98. As rear frame section 34 approaches its horizontal, extended position, auxiliary frame section 44 moves into horizontal alignment with rear frame section 34 and is supported in the latter position by link 48 on member 62 as shown in FIG. 7.

Rear leg member 114 is actuated from its inoperative position in which it disposed alongside rear frame section 34 when the bed frame is retracted as shown in FIGS. 1 and 7 to its operative position in engagement with the floor as shown in FIGS. 3, 4 and 7, by the relative motion between rear frame section 34 and drive lever 70 during extension of the bed frame. As members 66, 62 and 34 unfold or elongate from the retracted position, member 62 rotates in a counterclockwise direction relative to member 70 (as viewed in FIGS. 1 and 2) to impart forward movement to rear frame section 34 relative to member 70. Consequently, leg actuating link 122 actuates bell crank 18 to rotate about pivot 126 in a clockwise direction, which motion in turn acts through leg member 114 to cause link or bar 128 to pivot in a clockwise direction about pivot 132. As the bed frame moves forward beyond the position shown in FIG. 2, pivot point 116 moves over center with respect to pivots 130 and 120, and leg 114 pivots counterclockwise about pivot 130 to its floor engaging position.

Further counterclockwise rotation of bell crank 118 is prevented by the reaction between link 122 and lever 70, and leg member 114 is accordingly locked in its operative position when the bed frame is in its extended position.

To return the bed to its retracted position, the operator lifts upwardly on the folded bed frame such as by grasping bar 164. As a result, the curved, forward support arm 67 begins to rotate rearwardly about pivot 69, and rear frame section 34 rotates in a clockwise direction relative to pivot point 94 as viewed in FIG. 2. Auxiliary frame section 44 is moved downwardly into engagement with support member 98 as shown in FIG. 2, after which it is carried to its stored or retracted position into cavity 21. As pivot point 86 approaches pivot points 64 and 82, the compound link and lever system contracts to return the parts to their various retracted positions. Crossbar 164 is pulled into position in alignment with pivot point 42 between sections 36 and 38 and the portion of the springs supported between bar 164 and bar 45 may support the sofa cushions.

In the illustrated embodiment, the horizontal distance between the vertical axes y and y' (FIG. 1) passing through pivot points 68 and 69, respectively, is equal approximately to the sum of the horizontal distance from axis y' to pivot point 86 in its retracted position and the distance between pivot points 68 and 64 or lever 66. Moreover, pivot point 68 of lever 66 is spaced vertically above pivot point 69 of support arm 67 a distance equal approximately to the distance between pivot points 68 and 64, and the distance between pivot points 69 and 86 of arm 67 is approximately in the range of 1.7 to 1.8 times the distance between pivot points 68 and 64 of lever 66.

While a specific embodiment of the invention has been illustrated and described, it should be understood that the invention is not limited to the exact construction shown, and that various alterations in construction and arrangement of parts can be made by those skilled in the art without departing from the scope and spirit of the invention.

What is claimed is:

1. In a sofa bed including a sofa portion having side frame members and a front board extending between the forward ends of said side frame members to form a closed storage space, and a foldable bed frame adapted to be wholly received within said storage space beneath the upper edge of said front board, mechanism supporting a rear frame section of said foldable frame on at least one of said side frame member for movement from a retracted position within said storage space up and over the upper edge of said front board to an extended position projecting forwardly of the sofa portion including;

a support arm pivotally mounted at a first point on said side frame member and having its outer end rotatable about said first point from a retracted position within said storage space to an extended position above and forward of the upper edge of said front board, a control lever pivotally mounted at a second point on said side frame member spaced rearwardly of said first point for rotation about said second point, in a direction opposite to the direction of rotation of said support arm about said first point, from a retracted position in which it projects rearwardly of said second point to an extended position in which it projects forwardly of said second point, a pair of links each having one end pivotally connected to said control lever at spaced points near said one end thereof, one of said pair of links having its other end pivotally connected with said rear frame section, a drive lever fulcrumed intermediate its ends on said one link having one end pivotally connected with the other end of said other link of said pair of links, said drive lever being pivotally connected with said support arm on the opposite side of said drive lever fulcrum from said one end of said drive lever, and a connecting link pivotally connecting said drive lever with said rear frame section at a point spaced forwardly of said drive lever fulcrum, said other link of said pair moving from a dead center position relative to said drive lever fulcrum when said control lever is in its retracted position and during the initial movement of said support arm from its retracted to extended position causing said rear frame section to rotate about said second point on said side frame member during said initial movement of said support arm to pivot the forward end of the rear frame section above the front board, further rotation of said control lever toward its extended position causing said other link to move off dead center with respect to said drive lever fulcrum, said pair of links thereafter projecting said drive lever and rear frame section forwardly of said sofa portion.

2. In a sofa bed including a sofa portion having side frame members, a front board extending between the forward ends of the side frame members and a back portion with a cavity formed therein extending between the rear ends of the side frame members, said front board and side frame members defining a storage space, a foldable bed frame having a rear frame section and an auxiliary frame section pivotally connected to and supported from the rear end of the rear frame section, mechanism supporting the foldable bed frame on at least one of the side frame members for movement between a retracted position in which the folded bed frame is received within said cavity and said storage with said rear frame section positioned horizonally in said storage space with its forward end disposed adjacent the forward end of the storage space beneath the upper edge of the front board with said rear frame section extending substantially vertically from said rear frame section, and an extended position in which said rear frame section is disposed horizontally above and forward of said storage space with said auxiliary frame section normally horizontal and in line with said rear frame section, said mechanism comprising;

a control lever fulcrumed at a first point in said side frame member for rotation about said first point from a retracted position in which said control lever projects into said cavity, to an extended position in which said control lever projects forwardly of said back portion, a support arm fulcrumed at a second point on said side frame member for rotation about said second point from a retracted position in which it projects rearwardly of said second point into said storage space, to an extended position in which it projects above said storage space and forwardly of said front board, link means interconnecting said control lever and support arms with said rear frame section operative to rotate said rear frame section upwardly in said storage space until the forward end thereof projects above the front board during the initial movement of said support arm and control lever from their retracted positions, and thereafter to project said rear frame section over the front board to its extended position as said support levers move to their extended positions, and an auxiliary frame support member carried by said link means for supporting said auxiliary frame section in the cavity of the back portion with said auxiliary frame section projecting substantially vertically into said cavity from the rear end of the horizontal rear frame section when the bed frame is in the retracted position, said auxiliary frame support member being moved out of engagement with said auxiliary frame section as it assumes a horizontal position relative to the rear frame section as said bed frame approaches its extended position.

3. In a sofa bed including a sofa portion having side frame members and a front board secured between the forward ends of the side frame members, a foldable bed frame having a plurality of pivotally connected sections including a rear frame section and an auxiliary frame section having its forward end pivotally connected with the rear frame section, mechanism supporting said bed frame on at least one of the side frame members for movement between a retracted position in which said rear frame section is disposed substantially horizontally in said sofa portion with its forward end positioned adjacent the rear, inner face of the front board beneath the top edge of the front board, and in which retracted position said auxiliary frame section projects upwardly from the rear end of the rear frame section, and an extended position in which said rear and auxiliary frame sections are disposed in horizontal alignment in a horizontal plane above the top edge of the front board, said mechanism including;

a control lever having one end pivotally mounted at a first point on one of said side frame members with its other end rotatable about said first point between a retracted position and an extended position, a support arm having one end pivotally mounted at a second point on said side frame member with its other end rotatable about said second point between a retracted position and an extended position, link and lever means interconnecting said other ends of said control lever and support arm with said rear frame section operable in response to movement of said other ends from their retracted to extended positions to initially swing the forward end of said rear frame section upwardly from its retracted position until it clears the top edge of the front board and thereafter to swing said rear and auxiliary frame sections up and over said top edge of the front board to assume their horizontal aligned, extended positions as said control lever and support arm assume their extended positions, and support means carried by said link and lever means engageable with said auxiliary frame section in its retracted position and movable relative to said rear frame section during its movement from the retracted to extended position to permit said auxiliary frame section to pivot into alignment with the rear frame section, said support means thereafter moving out of engagement with said auxiliary frame section as the bed frame assumes its extended position.

4. In a sofa bed including a sofa portion having back and side frame members with a fixed front rail extending between the lower ends of said side frame members to define therewithin a storage enclosure within the sofa, a fixture supporting the pivotally connected rear frame and auxiliary frame sections of a foldable bed frame for movement over said rail between (1) a retracted position in which said bed frame is contained within said storage enclosure with said rear frame section generally horizontal and said auxiliary frame section extending generally vertically upwardly therefrom adjacent the back of the sofa and (2) an extended position in which said bed frame lies above and extends forwardly of said rail with said rear frame section substantially horizonally disposed and said auxiliary frame section normally in line with said rear frame section, said fixture comprising:

a control lever supported adjacent one end for pivotal motion about a first fixed pivot on a side frame member, a guiding link pivotally connected to the outer portion of said control lever and to said rear frame section, a drive lever linkage means pivotally interconnecting said control lever, said guiding link intermediate the connection to said control lever and said rear frame section, and said rear frame section spaced from the pivotal connection of said auxiliary frame section, a support arm pivotally supported at one end by a second fixed pivot forwardly of said first fixed pivot on a side frame member for pivotal movement of the other end of said support arm in a direction opposite that of said control lever between a position within said enclosure to an extended position above said rail with the outer portion of said other end being pivotally connected to said drive lever linkage means intermediate the pivotal connection to said rear frame section and said guiding link, and a support link pivotally connected at one end to said auxiliary frame section spaced from the pivotal connection to said rear frame section and at the other end to said guiding link intermediate the pivotal connections to said control lever and said rear frame section.

5. The fixture described in claim 4 wherein said drive lever linkage means includes a restraining link pivotally connected at one end to said control lever and pivotally connected at the other end adjacent to and spaced from the pivotal connection to said guiding link.

6. The fixture as described in claim 5 wherein said drive lever linkage means includes a crank lever pivotally connected to said guiding link and said restraining link adjacent one end portion and having means connected to the other end portion for pivotally connecting said other end to said support arm and to said rear frame section.

7. The fixture as described in claim 6 wherein said other end portion of said crank lever has a pivotal connection to said support arm and a pivotal connection to one end of a link of which the other end pivotally connects to said rear frame section.

8. The fixture as described in claim 4 wherein a bed frame supporting leg pivotally connects to said rear frame section and a link pivotally connects between said leg and said drive lever linkage means for movement of said leg between (1) a position extending downwardly from said rear frame section to have the lower end rest on the floor ahead of said rail when said bed frame is in said extended position and (2) a position adjacent to and substantially parallel to said rear frame section when said bed frame section is in said retracted position.

9. The fixture described in claim 4 wherein one of said pivotal connections of said support frame is a lost motion connection permitting said auxiliary frame section to be rotated about the pivotal connection to said rear frame section between a normal position in line with said rear frame section and a position inclined upwardly thereto when said bed frame is in said extended position.

10. The fixture as described in claim 9 wherein said lost motion connection includes a locking member and a latching member engageable with said locking member upon sliding motion of said lost motion connection to secure said auxiliary frame section at the inclined position and release it therefrom.

11. The construction defined in claim 2 further including a forward support member carried by said support arm for supporting the rear frame section in said storage space when the bed frame is in the retracted position, said support member moving out of engagement with the bed frame as it moves from its retracted position.

12. The construction defined in claim 3 further including:

support link means having one end pivotally connected with one of said auxiliary frame section and said link and lever means and its other end slidably connected with the other of said auxiliary frame section and said link and lever means, and latching means selectively operable by said support link means upon pivotal movement of said auxiliary frame section about said rear frame section to an inclined position relative to said rear frame section in its horizontal, extended position to lock said auxiliary frame section in said inclined position.

13. The construction defined in claim 3 further including:

a rear leg member pivotally connected to said rear frame section for movement relative to said rear frame section between an inoperative position in substantially parallel relationship with said rear frame section and a floor engaging position in which it is adapted to extend between the horizontal extended rear frame section and the floor, and a leg actuating link interconnected between said link and lever means and said rear leg member operable to actuate said rear leg member between its inoperative and floor engaging positions in response to movement of said rear frame section between its retracted and extended position, respectively.

*14. In a sofa bed assembly, a sofa body having a hollow back, a crosspiece at the base of the back, sides, and a front board whose top edge is approximately at the level of said crosspiece; a mechanism formed of pivoted sections including in succession a rear section, a lower horizontal section, a front vertical section, and an upper horizontal section, said sections being foldable between collapsed sofa position in which the horizontal sections lie in superposed relation while the rear section is within said back and extended bed position in which said sections extend in horizontal alignment forwardly from in front of the back and across said front board; and a supporting linkage independent of said rear section and directly connected to the rear of said lower horizontal section for pivotally connecting said mechanism to said sofa body.*

*15. A sofa bed assembly as set forth in claim 14, in which said supporting linkage comprises an elongate link mounted for movement between an upright disposition behind said crosspiece and a substantially horizontal disposition beneath said crosspiece, the rear region of*

*said link being articulated to the sofa body within said hollow back, the forward end being pivoted to said mechanism at the rear of said lower horizontal section.*

*16. A sofa bed assembly as set forth in claim 14, said elongate link being pivoted at its forward end to the pivot between said rear section and said lower horizontal section.*

*17. In a sofa bed assembly, a sofa body having a hollow back, a crosspiece at the base of the back, sides, and front board whose top edge is approximately at the level of said cross-piece; a mechanism formed of pivoted sections including in succession, a rear section, a lower horizontal section, a front vertical section, and an upper horizontal section, said sections being foldable between collapsed sofa position in which the horizontal sections lie in superposed relation while the rear section is within said back and an extended bed position in which said sections extend in horizontal alignment forwardly from in front of the back and across said front board; and a supporting linkage independent of said rear section for pivotally connecting said mechanism to said sofa body within said hollow back, said supporting linkage comprising: an elongate link mounted for movement between an upright dis-*

*position behind said crosspiece and a substantially horizontal disposition beneath said crosspiece, the rear region of said link being articulated to the sofa body within said hollow back, the forward end being pivoted to the pivot between said rear section and said lower horizontal section, and said mechanism including an activating link and, linkage between said activated link and said rear section for bringing the latter into alignment with said horizontal section when the mechanism is extended.*

References Cited

The following references, cited by the Examiner, are of record in the patented file of this patent or the original patent.

UNITED STATES PATENTS

| | | | |
|---|---|---|---|
| 2,749,559 | 6/1956 | Petersen | 5—13 |
| 2,844,827 | 7/1958 | Bank et al. | 5—13 |
| 3,165,757 | 1/1965 | Rogers | 5—13 |
| 3,209,377 | 10/1965 | Fox | 5—13 |
| 3,247,526 | 4/1966 | Rogers | 5—13 |
| 3,321,777 | 5/1967 | Pokorny | 5—13 |

CASMIR A. NUNBERG, Primary Examiner